Sept. 6, 1949.                C. A. BICKEL ET AL                2,481,383
                                  MACHINE TOOL
Filed April 9, 1946                                      4 Sheets-Sheet 1
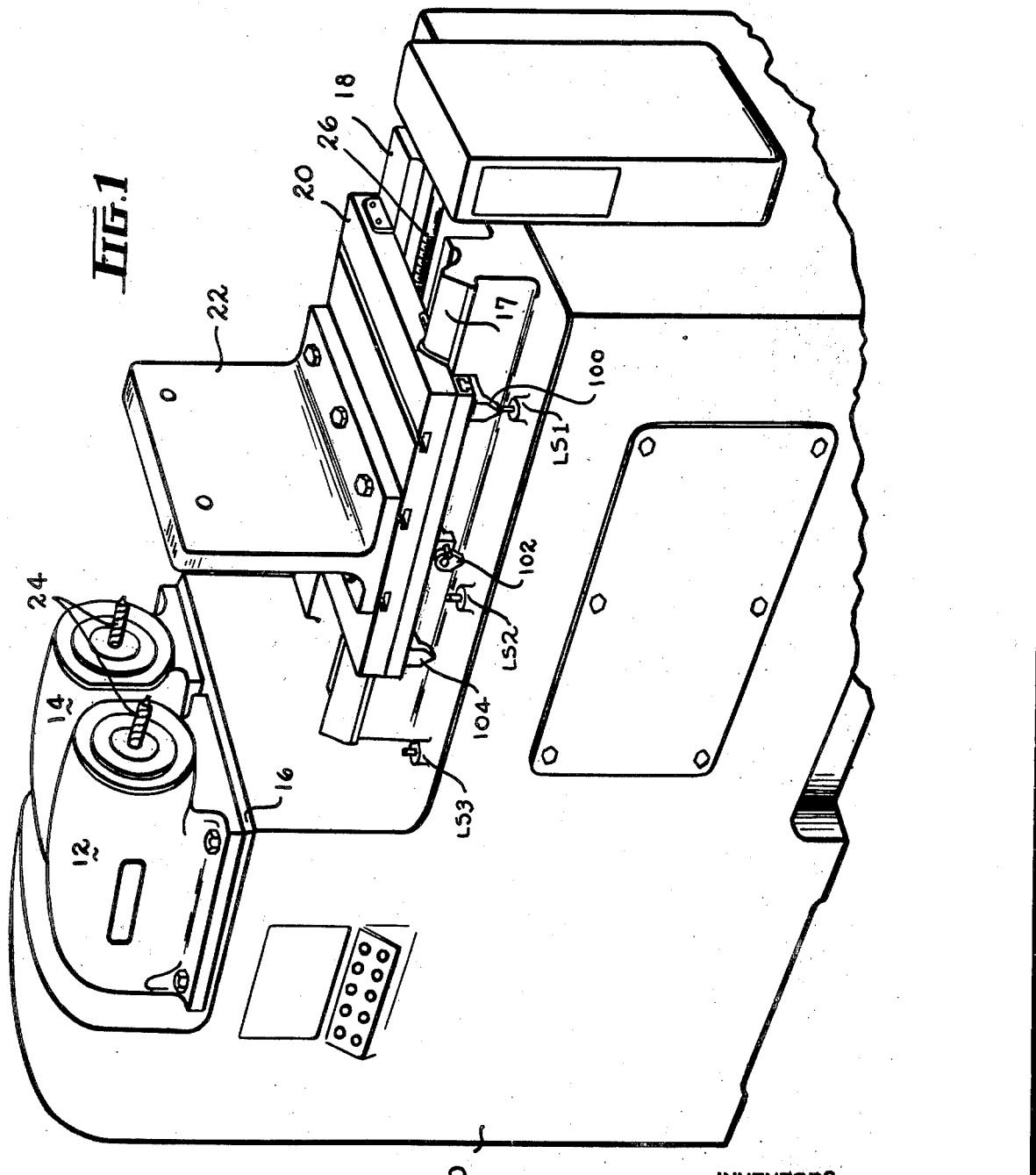
INVENTORS
CLIFFORD A. BICKEL
STANLEY A. BRANDENBERG
BY THEODORE FOSTER
Toulmin & Toulmin
ATTORNEY Sept. 6, 1949.  C. A. BICKEL ET AL  2,481,383
MACHINE TOOL
Filed April 9, 1946  4 Sheets-Sheet 2
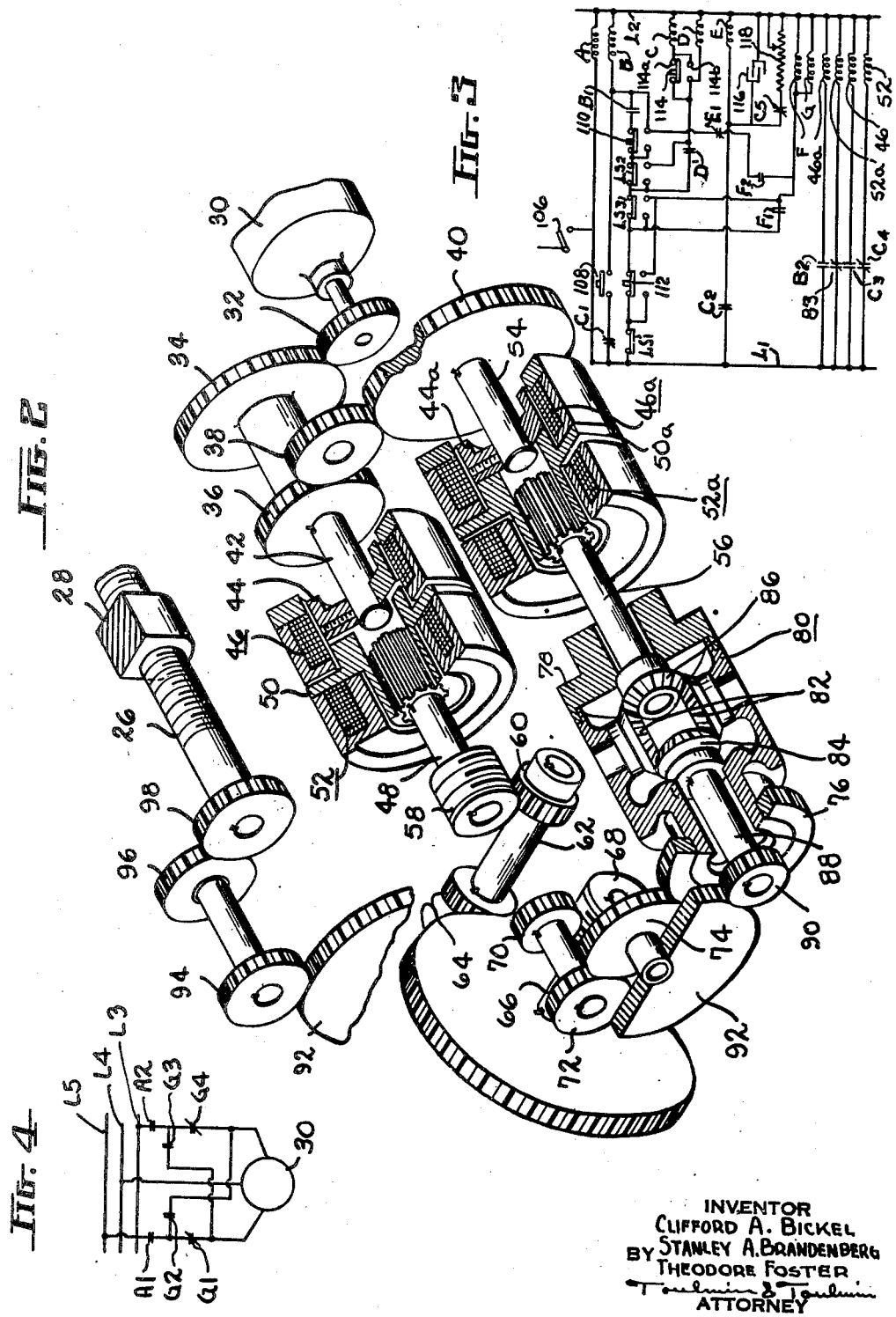
INVENTOR
CLIFFORD A. BICKEL
BY STANLEY A. BRANDENBERG
THEODORE FOSTER
ATTORNEY

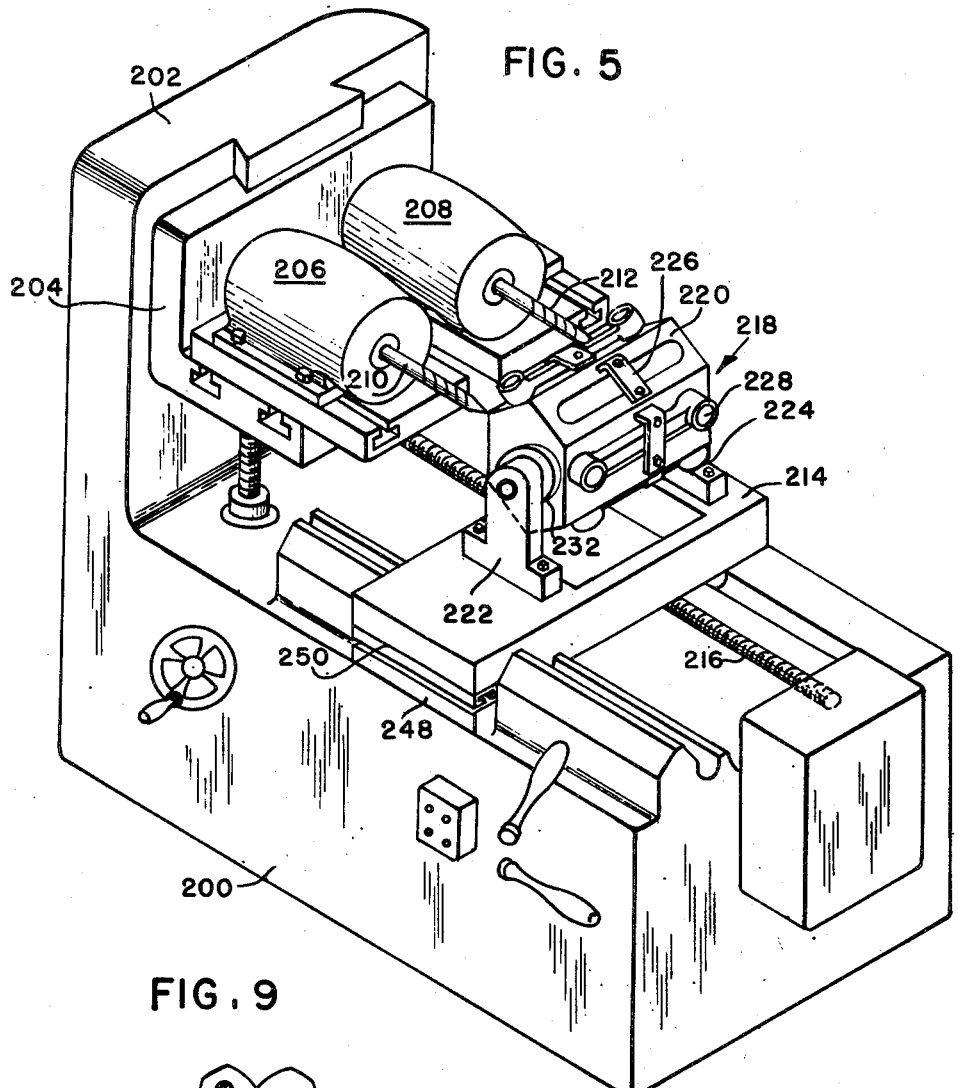

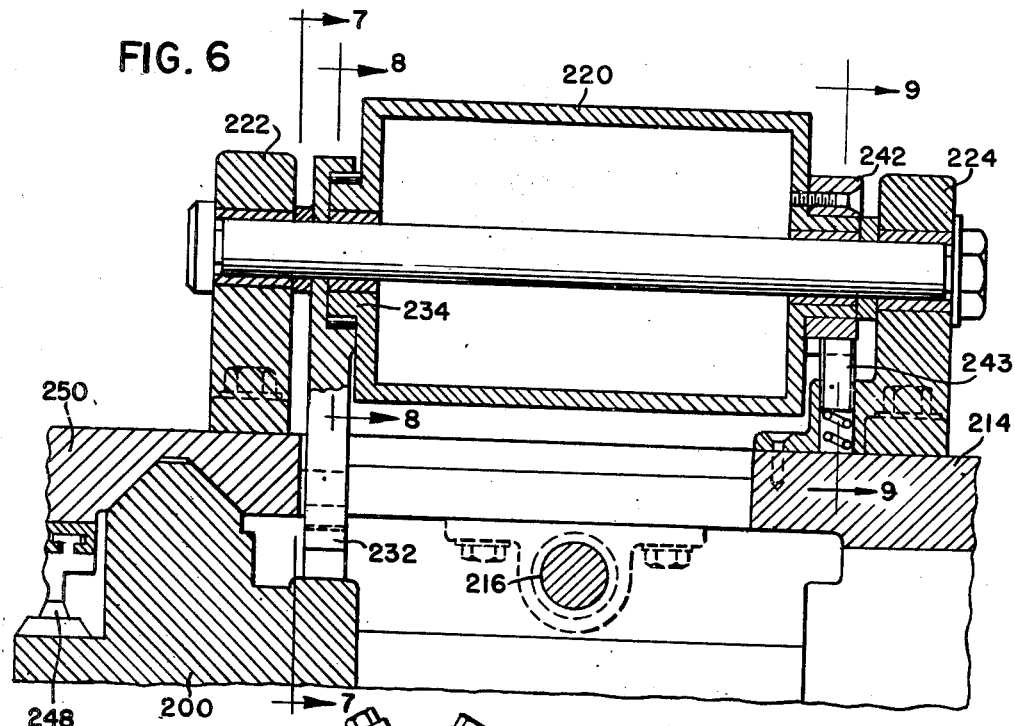
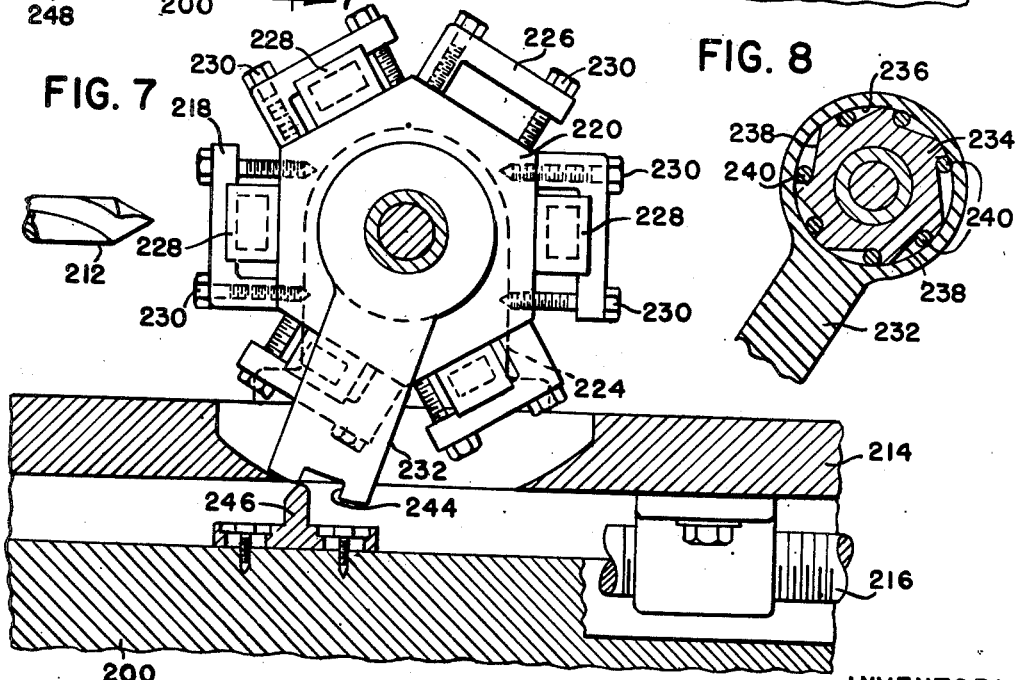

Patented Sept. 6, 1949

2,481,383

UNITED STATES PATENT OFFICE 2,481,383

MACHINE TOOL

Clifford A. Bickel, Stanley A. Brandenburg, and Theodore Foster, Sidney, Ohio, assignors to The Monarch Machine Tool Co., Sidney, Ohio, a corporation of Ohio Application April 9, 1946, Serial No. 660,794

5 Claims. (Cl. 77—32)

This invention relates to machine tools and, particularly, to machine tools having multiple operating heads and a table or slide movable relative thereto in timed relationship.

It is an object of this invention to provide a machine tool capable of operating a plurality of workpieces simultaneously.

It is another object to provide a machine tool having a work mount which simultaneously reciprocates a plurality of work members to and from a plurality of tool holders.

It is still another object to provide a machine tool having a slide which is automatically reciprocated at predetermined speeds to and from a plurality of work tools.

Still another object is to provide a machine tool according to the foregoing objects wherein the tools and workpieces may be interchanged.

It is still another object to provide a mechanism for relatively reciprocating a plurality of work tools and a plurality of workpieces at predetermined adjustable speeds.

It is another object to provide a machine tool having a support which reciprocates to and from a plurality of rotating spindles and which has a rapid advance, a feed and a rapid retraction, the length of which may be selectively adjustable.

Another object of this invention is to provide a machine tool in which there are a plurality of spindles and a reciprocable table, the table being adapted for supporting an indexing work fixture and the work fixture and spindles being adjustable relatively for performing multiple operations on workpieces.

It is also an object to provide a machine tool having a plurality of spindles and a reciprocable work fixture which is automatically indexed into successive positions as the table reciprocates.

These and other objects and advantages will become more apparent upon reference to the accompanying drawings, in which:

Figure 1 is a perspective view of a machine tool constructed according to this invention;

Figure 2 is a diagrammatic view of the mechanism for reciprocating the slide of the machine shown in Figure 1;

Figures 3 and 4 are wiring diagrams for controlling the operation of the power system of Figure 2;

Figure 5 is a perspective view of a modified form of machine tool according to this invention;

Figure 6 is a transverse section through the work holding fixture of the machine of Figure 5;

Figure 7 is a section taken on the line 7—7 of Figure 6;

Figure 8 is a view taken on the line 8—8 of Figure 6; and

Figure 9 is a view indicated by the line 9—9 of Figure 6.

General arrangement

This invention generally comprises a machine tool bed which mounts a slide and a pair of spindles. The spindles may be powered from any suitable source such as a hydraulic power unit or an electric power unit in the machine bed and may be driven at any suitable speed which is preferably adjustable to meet the requirements of various classes of work.

The mechanism for reciprocating the slide is substantially identical with that shown in our copending application Serial No. 571,530 filed January 5, 1945. This mechanism comprises a source of power and a first and a second driving connection between the said source of power and the machine slide. The first and second driving connections have different drive ratios so that the slide is driven at a different rate of speed by one than by the other. Electrically actuated magnetic brakes and clutches are effective for rendering one or the other of said driving connections operative in order to obtain the rapid advance of the slide and the feed thereof. The source of power is reversible in order to obtain the rapid retraction of the slide and both of said driving connections are rendered inoperative in order to provide for a predetermined dwell of the slide at any time.

The control system for actuating the clutches and brakes is controlled by limit switches suitably located to be engaged by dogs or cams adjustably carried by the machine slide.

The driving mechanism for the slide includes change gears so that the speed of reciprocation thereof can be adjusted as the job requires.

Structural arrangement

Referring to the drawings more in detail, 10 represents a machine bed mounting the spindles 12 and 14 on the pad 16. The bed 10 comprises the flat way 18 and the V-way 17 on which is reciprocably carried the slide 20. The heads 12 and 14 are preferably aligned with the path of the slide 20 so that workpieces carried by the support 22 on the said slide will be squarely presented to the tools 24 carried in the said spindles. Optionally, the workpieces may be chucked into the spindles 12 and 14 and the tools mounted on the support 22.

The slide 20 is reciprocated by a screw 26 journalled in the bed 10 which it engages by means of a nut 28 (Figure 2) fixedly carried by the said slide.

The mechanism for rotating the screw 26 thereby to drive the table 20 in different directions is shown in Figure 2 wherein it will be seen to comprise a drive motor at 30 which drives through a pinion 32 into a gear 34. The gear 34 has fastened thereto a gear 36 which drives through an idler 38 into a gear 40. The shaft 42 which mounts the gears 34 and 36 has secured to the end thereof a magnetic member 44 which is rotatable within an electromagnet coil and core generally indicated at 46.

In axial alignment with the shaft 42 is a shaft 48 having a splined end thereon which slidably receives the similarly splined armature 50. The armature 50 is adapted, when the coil at 46 is energized, to move into driving engagement with the member 44 thereby drivingly to connect the shafts 42 and 48.

On the opposite side of the armature 50 from the coil 46 is a coil and core generally indicated at 52. The coil at 52, when energized, draws the armature 50 leftwardly clamping it stationarily against the core and thereby locking the shaft 48 against rotation. The shaft 48 is thus adapted selectively to be driven or to be clamped against rotation.

The shaft 54 which mounts the gear 40 and the shaft 56 in axial alignment therewith are equipped with an armature and clutch and brake coils identical with those associated with the shafts 42 and 48. These latter are identified by the same numerals with the addition of a subscript a.

The shaft 48 carries a worm 58 which drives the worm wheel 60 mounted on the shaft 62 extending transversely of the shaft 48. The shaft 62 carries one of a pair of change gears generally indicated at 64, the other of which is mounted on the shaft 66. The shaft 66 has keyed thereto the worm 68 that drives the worm wheel 70 which is connected with a gear 72. The gear 72 drives through the idler gear 74 into a gear 76 affixed to the housing 78 of a differential unit generally indicated at 80.

The differential at 80 includes the bevel gears 82 journalled on the housing 78 and the bevel gears 84 and 86 in mesh therewith.

The gear 86 is mounted on the shaft 56 while the gear 84 is mounted on the shaft 88 which also carries the pinion 90 adapted for meshing with the gear 92. The gear 92 drives through the gears 94 and 96 into the gear 98 which is keyed to the screw 26.

Electrical control system

The control system comprises the circuit shown in Figure 3 which includes a plurality of limit switches carried on the bed 10. These limit switches are indicated at LS1, LS2 and LS3 and are adapted for engagement, respectively, by the switch cams 100, 102 and 104. The cam at 102 is adapted for actuating the switch LS2 when the table moves leftwardly and for idly passing the said switch when the table moves rightwardly.

The motor 30 is preferably a three phase motor but may be of any other type which may be electrically reversed by means of relays. The relays and contactors are supplied with direct current power from any suitable source such as a generator or electronic rectifier.

Referring to Figure 3, the direct current power supply lines are indicated at L1 and L2. Connected between the lines L1 and L2 is a relay coil A which is adapted to be energized by the closing of the switch 106. Associated with the coil A are the normally open blades A1 and A2 (Figure 4) which, upon being closed by the energization of the coil A, conduct power to the motor 30 from the power lines L3, L4 and L5.

Connected between L1 and L2 is the relay coil B which has in series therewith the normally open push button 108 and the normally closed contactor blades C1. The coil B is operable, when energized, to close the normally open contactor blades B1 and B2, and to open the blades B3. The blades C1 and the switch 108 are bypassed by a line including the normally open blades B1, the normally closed contacts of push button switch 110, the normally closed contacts of the single pole double throw limit switch LS2, the normally closed contacts of the single pole double throw limit switch LS3, the normally closed contacts of the push button switch 112, and the normally closed contacts of limit switch LS1. The push button switch 108 and the normally closed blades C1 are further bypassed by a line which includes the normally closed blades E1, the normally open blades F2 and F1, the normally closed contacts of push button switch 112 and the normally closed contacts of limit switch LS1.

The relay coils C and D are connected between the lines L1 and L2 by a line which includes the normally open contact blades D1 of the coil D, the normally closed contacts of single pole double throw limit switch LS3, the normally closed contacts of push button switch 112, and the normally closed contacts of limit switch LS1. Also connected serially with the coil C is the push button switch 114 having the normally closed contacts 114a and the normally open contacts 114b.

The coil C is operable, when energized, to close the blades C2 and C3 while opening the blades C1, C4 and C5. The coil D, when energized, closes the blades D1.

A relay coil E, having normally closed blades E1, is connected between the lines L1 and L2 through the normally open contactor blades C2 of the coil C. Connected in parallel with the coil E is a condenser 116 which has shunted there across the adjustable resistor 118. Serially connected with the resistor 118 are the normally closed blades C5 of the coil C. The condenser resistor arrangement is for the purpose of delaying the de-energization of the relay coil E for a purpose which will be described hereinafter.

A pair of relay coils F and G are connected between the lines L1 and L2 through a pair of normally open contactor blades F1, the normally closed contacts of the push button switch 112 and the normally closed contacts of limit switch LS1. Relay coil B is shunted with relay coils F and G through the normally open blades F2 and normally closed blades E1.

The coil of the clutch 46a is connected between the power lines L1 and L2 through the normally open blades B2 of the coil B while the coil of the brake 52a is connected between the power lines through the normally closed blades B3 of the coil B.

The coil of the clutch member 46 and the coil of the brake 52 are connected between the lines L1 and L2 by the normally open contacts C3 and the normally closed contacts C4 respectively.

The relay coil G is for the purpose of reversing the direction of rotation of the motor 30 and, to this end, has associated therewith the contact blades G1, G2, G3 and G4. The blades G1 and G4 are normally closed and in series with the blades A1 and A2 of the coil A. When the coil G is energized, the blades G1 and G4 open while the blades G2 and G3 close thus reversing the phase rotation of the motor 30 and, therefore, also the direction of rotation thereof.

*Operation*

In operation, a work cycle is commenced by closing the switch 106 which energizes the coil A and starts the motor 30 in a forward direction. The push button 108 is then closed to energize the coil B, a holding circuit for which is established through the blades B1.

Energization of the coil B also closes the blades B2 and opens the blades B3 which, respectively, energize the clutch coil 46a and deenergizes the brake coil 52a. The armature 50a is thus moved rightwardly into driving engagement with the magnetic member 44a. At the same time, the coil 52 is energized while the coil 46 is deenergized so that the armature 50 is locked against the brake 52.

The motor 30 now drives through 32, 34, 36, 38, 40, 54, 50a and shaft 56 into the bevel gear 86.

As mentioned before, the armature 50 is locked against rotation and the shaft 48 is thus also held against rotation. The gear train including 58, 60, 64, 68, 70, 72, 74 and 76, therefore, holds the housing 78 of the differential 80 against rotation. The rotation of the gear 86, therefore, drives through the gears 82 into the gear 84 and thence through 88, 90, 92, 94, 96 and 98 into the screw 26 thereby to drive the table 20 by means of the nut 28.

The table 20 moves leftwardly rapidly until the cam 102 engages the switch LS2. When the switch LS2 is actuated, the holding circuit for coil B is broken and the blades B2 open while the blades B3 close, thereby deenergizing 46a while energizing 52a. The actuation of LS2 also completes a circuit to the contactor coils C and D which are held by a circuit established through the blades D1. The energization of C energizes the coil at 46 while deenergizing the coil at 52.

Thus, the armature 50a is locked against rotation while the armature 50 is moved into driving engagement with the magnetic member 44. The drive from the motor 30 is now into the housing 78 of the differential 80 while the bevel gear at 86 is locked against rotation. The rotation of the housing 78 causes the gears 82 to roll on the stationary gear 86 and thus to actuate the gear 84 to drive through the aforementioned gear train into the screw 26. The direction of rotation of the screw 26 is such that the table 20 continues to move in the same direction but the gear ratio between the motor 30 and the said screw is such that the movement is at a reduced rate. The change gears at 64 determine the particular rate of movement of the said table and are so selected that the said rate has an optimum value.

The table 20 continues its leftward movement at reduced or feed speed until the cam 104 engages the limit switch LS3 whereupon the holding circuit for the coils C and D is broken to permit the blades C2 and C3 to open while closing the blades C1, C4 and C5.

The clutch coil 46 thus becomes deenergized while the brake coil 52 becomes energized, the latter moving the armature 50 into locking engagement with the said brake.

The limit switch LS3 also energizes the coils F and G thereby reversing the motor 30 and closing the blades F1 and F2, the former of which provides a holding circuit for coils F and G while the latter of which sets up a holding circuit for coil B.

The closing of F2, however, is not effective to energize coil B because the blades E1 remain open until the energy stored in the coil E is dissipated through the condenser-resistor arrangement at 116, 118. The resistor, being adjustable, may be set to predetermine this time interval within relatively close limits.

It will be noted that both of the brake coils are energized so that the entire gear train to the table reciprocating screw 26 is locked. The table 20 is thus locked in position and dwells for a predetermined period of time.

Upon the accomplishment of the time delay period, the coil E becomes deenergized and the blades E1 close to complete a circuit through the coil B by energizing the latter. The clutch coil 46a is thereby energized while the brake coil 52a is deenergized. Since the motor 30 is now running in reverse direction, the table 20 will be rapidly retracted from its forward position.

The retraction movement of the table 20 continues until the cam 100 opens the limit switch LS1. This deenergizes all of the coils C, D, E, F and G so that the table halts with both of the brakes energized and the motor again running in a forward direction. A new work cycle may be commenced by closing the button 108.

The push button switch 114 is provided for the purpose of halting the feeding of the table 20 whenever desired, and also for the purpose of "inching" the table forward.

The push button 112 may be depressed at any time to return the table 20 to its initial position while the push button 110 may be depressed at any time during the rapid traverse of the table 20 toward or from the spindles 12, 14 to stop the movement of the said table.

It will be apparent that this invention is capable of being modified in various manners. For example, the differential unit at 80, while it is illustrated as a geared device employing bevel gears, could, it will be understood, be replaced by a planetary or epicyclic gear train if found desirable. Likewise, although the output member is shown as a screw, it will be apparent that a rack and pinion or a drive shaft or any other power absorbing or transmitting means could be actuated by the output shaft 88.

It will also be apparent that while only one drive motor is shown in the drawings there could be a drive motor for each of the shafts 42 and 54 and that these motors could be reversible and variable speed or constant speed as desired. These motors could also comprise braking means integral therewith in which case the brake units 52 and 52a would be eliminated and the shafts 48 and 56 made integral with the shafts 42 and 54, respectively.

In the event that exceedingly close control of the driven member was not required, the motors could drive through self-locking worm gears into the shafts 42 and 54 and, if suitable controls were provided, the motors could be energized to actuate the shafts and de-energized to lock them. Thus, while it is preferable, for the accurate control of the driven member, to employ electrically actuated clutches and brakes for driving and for braking the shafts 48 and 56, in certain instances other, less precise, electrically actuated means could be provided for performing this function.

Modification of Figures 5 through 9

In Figures 5 through 9 there is illustrated a somewhat modified arrangement wherein the machine bed 200 comprises a vertical slide 202 in which is reciprocably mounted a spindle supporting frame 204 that carries the work spindles 206 and 208. The spindles 206 and 208 are fitted with the tools 210 and 212 that are driven in rotation by any suitable power means.

Reciprocable on the bed 200 is the slide 214 which is driven in reciprocation by the screw 216 in a manner already described in connection with the modification of Figure 1.

The work supporting fixture is indicated generally at 218 and comprises a turret 220, which may be hexagonal, and which is rotatably mounted in the brackets 222 and 224. The several faces of the turret 220 are adapted for supporting suitable workpiece receiving fixtures or are themselves fitted with clamps for securing workpieces to the said turret faces. Such clamps could take the form of the brackets indicated at 226 which clamp the workpieces 228 to the turret faces as by the bolts 230.

For indexing the turret in its several operative positions, there is provided the arm 232 which is connected with the turret through an over-running clutch mechanism illustrated in Figure 8. The turret has a portion 234 extending therefrom into a cylindrical recess 236 of the arm 232 and has a plurality of wedge shaped peripheral notches 238 within which are located the rollers 240. When the arm 232 is moved in a clockwise direction, as viewed in Figure 8, the portion 234 and, therefore, the turret 220 is driven. However, when the arm 232 moves in the opposite direction the turret is not driven.

Also associated with the turret is a detent mechanism consisting of the notched wheel 242 secured to the turret and the spring pressed plunger 243 that is located in the bracket 224. By means of this detent mechanism the indexing of the turret is made precise and is retained in its indexed position during the machining of the workpiece.

For actuating the arm 232 as the table 214 reciprocates, there is provided in the end of the said arm a notch 244 and connected with the machine bed 200 is an upstanding finger 246 which lies in the path of the arm 232 as the said table reciprocates. When the table is moving forward the arm 232 is rocked in a counterclockwise direction and does not actuate the turret 220. However, when the table 214 retracts the arm 232 is rocked in a clockwise direction and indexes the turret to its next operative position.

As in the case of the structure illustrated in Figure 1, the bed 200 may mount a plurality of limit switches as at 248 which are actuated by a plurality of cams carried by the table 214 on an extension as at 250.

It will be understood that it is desired to comprehend such modifications in arrangement and structure and substitution of equivalents as may be considered to come within the spirit of the invention and the scope of the appended claims.

We claim:

1. In a machine tool, bed support means, spindle means carried by said bed support means, table support means reciprocally movable on said bed support means toward and away from said spindle means, reversible power means for driving said table support means, a plurality of selectably engageable driving connections having different speed ratios interconnecting said table support means with said power means, an electrical brake and an electrical clutch associated with each of said driving connections energizable selectively to render ineffective or effective the associated driving connection, first electrical control means for operating the power means in a first direction and for energizing the clutch in a first of said driving connections and the brake in a second of said driving connections, the said first of said driving connections having a higher speed ratio than the second of said driving connections to bring about a rapid advance of said table support means relative to said spindle means, second electrical control means for continuously operating the power means in said first direction but energizing the brake in the said first of said driving connections and the said clutch in the second of said driving connections, the said second of said driving connections effecting a lower speed ratio than that of the said first of said driving connections to bring about a feeding advance movement of said table support means relative to said spindle means, third electrical control means for operating the power means in a reverse direction and for energizing the clutch in the first of said driving connections and the brake in the second of said driving connections to bring about a rapid reverse traverse of the table support means away from the spindle means, first, second and third switch means mounted at spaced intervals on one of said support means, and switch actuating means mounted on the other of said support means, said switch actuating means actuating the first, second and third switch means in sequence to bring about a cycle of operation upon relative movement between the bed support means and the table support means, said first, second and third switch means respectively governing the operation of the first, second and third electrical control means to bring about the said complete cycle of operation of said table support means relative to said spindle means.

2. In a machine tool, bed support means, spindle means carried by said bed support means, table support means reciprocally movable on said bed support means toward and away from said spindle means, reversible power means for driving said table support means, a plurality of selectably engageable driving connections having different speed ratios interconnecting said table support means with said power means, an electrical brake and an electrical clutch associated with each of said driving connections energizable selectively to render ineffective or effective the associated driving connection, first electrical control means for operating the power means in a first direction and for energizing the clutch in one of said driving connections and the brake in the remaining of said driving connections, the said one of said driving connections having a higher speed ratio than the remaining of said driving connections to bring about a rapid advance of said table support means relative to said spindle means, second electrical control means for continuously operating the power means in said first direction but energizing the clutch in another of said driving connections and the brake in the remaining of said driving connections, the said another of said driving connections having change-gear means and effecting a lower speed ratio than that of the said one of said driving connections to bring about a feeding advance movement of said table support means relative to said spindle means, third electrical control means for operating the power means in a reverse direction and for energizing the clutch in the one of said driving connections and the brake in the remaining of said driving connections to bring about a rapid reverse traverse of the table support means away from the spindle means, first, second and third switch means mounted at spaced intervals on one of said support means, and switch actuating means mounted on the other of said support means, said switch actuating means actuating the first, second and third switch means in sequence to bring about a cycle of operation upon relative movement between the bed support means and the table support means, said first, second and third switch means respectively governing the operation of the first, second and third electrical control means to bring about the said complete cycle of operation of said table support means relative to said spindle means.

3. In a machine tool, bed support means, spindle means carried by said bed support means, table support means reciprocally movable on said bed support means toward and away from said spindle means, reversible power means for driving said table support means, a plurality of selectably engageable driving connections having different speed ratios interconnecting said table support means with said power means, an electrical brake and an electrical clutch associated with each of said driving connections energizable selectively to render ineffective or effective the associated driving connection, first electrical control means for operating the power means in a first direction and for energizing the clutch in one of said driving connections and the brake in the remaining of said driving connections, the said one of said driving connections having a higher speed ratio than the remaining of said driving connections to bring about a rapid advance of said table support means relative to said spindle means, second electrical control means for continuously operating the power means in said first direction but energizing the clutch in another of said driving connections and the said brake in the remaining of said driving connections, the said another of said driving connections effecting a lower speed ratio than that of the said one of said driving connections to bring about a feeding advance movement of said table support means relative to said spindle means, third electrical control means for operating the power means in a reverse direction and for energizing the clutch in the one of said driving connections and the brake in the remaining of said driving connections to bring about a rapid reverse traverse of the table support means away from the spindle means, first, second and third switch means mounted at spaced intervals on one of said support means, and switch actuating means mounted on the other of said support means, said switch actuating means actuating the first, second and third switch means in sequence to bring about a cycle of operation upon relative movement between the bed support means and the table support means, said first, second and third switch means respectively governing the operation of the first, second and third electrical control means to bring about the said complete cycle of operation of said table support means relative to said spindle means, said third electrical control means having means for momentarily rendering ineffective the said driving connections during the reversal of the power means prior to the initiation of the rapid reverse traverse movement of the table support means.

4. In a machine tool, bed support means, spindle means carried by said bed support means, table support means reciprocally movable on said bed support means toward and away from said spindle means, reversible power means for driving said table support means, a plurality of selectably engageable driving connections having different speed ratios interconnecting said table support means with said power means, means associated with each of said driving connections operable selectively to render ineffective or effective the associated driving connection, first electrical control means for operating the power means in a first direction and for rendering one of said driving connections effective, the said one of said driving connections having a higher speed ratio than the remaining of said driving connections to bring about a rapid advance of said table support means relative to said spindle means, second electrical control means for continuously operating the power means in said first direction but rendering said one of the driving connections ineffective and rendering another of said driving connections effective, the said another of said driving connections effecting a lower speed ratio than that of the said one of said driving connections to bring about a feeding advance movement of said table support means relative to said spindle means, third electrical control means for operating the power means in a reverse direction and for again rendering the one driving connection effective to bring about a rapid reverse traverse of the table support means aawy from the spindle means, first, second and third switch means mounted at spaced intervals on one of said support means, and first, second and third switch actuating means mounted at spaced intervals on the other of said support means, said first, second and third actuating means respectively actuating the first, second and third switch means in sequence to bring about a cycle of operation upon relative movement between the bed support means and the table support means, said first, second and third switch means respectively governing the operation of the first, second and third electrical control means to bring about the said complete cycle of operation of said table support means relative to said spindle means.

5. In a machine tool, bed support means, spindle means carried by said bed support means, table support means reciprocally movable on said bed support means toward and away from said spindle means, reversible power means for driving said table support means, a plurality of selectably engageable driving connections having different speed ratios and interconnecting said table support means with said power means, means associated with each of said driving connections operable selectively to render ineffective or effective the associated driving connection, first electrical control means for operating the power means in a first direction and for rendering one of said driving connections effective, the said one of said driving connections having a higher speed ratio than the remaining of said driving connections to bring about a rapid advance of said table support means relative to said spindle means, second electrical control means for continuously operating the power means in said first direction but rendering said one of the driving connections ineffective and rendering another of said driving connections effective, the said another of said driving connections effecting a lower speed ratio than that of the said one of said driving connections to bring about a feeding advance movement of said table support means relative to said spindle means, third electrical control means for operating the power means in a reverse direction and for again rendering the said one driving connection effective to bring about a rapid reverse traverse of the table support means away from the spindle means, first, second and third switch means mounted at spaced intervals on one of said support means, and switch actuating means mounted on the other of said support means for cooperating with and actuating said switch means.

CLIFFORD A. BICKEL.
STANLEY A. BRANDENBURG.
THEODORE FOSTER.

REFERENCES CITED

The following references are of record in the file of this patent:

UNITED STATES PATENTS

| Number | Name | Date |
| --- | --- | --- |
| 552,379 | Langelier | Dec. 31, 1895 |
| 839,740 | Embler et al. | Dec. 25, 1906 |
| 2,255,739 | Curtis | Sept. 9, 1941 |